(12) United States Patent
Rudmann et al.

(10) Patent No.: US 8,828,174 B2
(45) Date of Patent: Sep. 9, 2014

(54) METHOD OF MANUFACTURING A PLURALITY OF OPTICAL DEVICES

(75) Inventors: Hartmut Rudmann, Jona (CH); Susanne Westenhofer, Wettswil (CH); Diane Morgan, Zurich (CH)

(73) Assignee: Heptagon Micro Optics Pte. Ltd., Singapore (SG)

( * ) Notice: Subject to any disclaimer, the term of this patent is extended or adjusted under 35 U.S.C. 154(b) by 639 days.

(21) Appl. No.: 13/059,250

(22) PCT Filed: Aug. 17, 2009

(86) PCT No.: PCT/CH2009/000271
§ 371 (c)(1),
(2), (4) Date: May 10, 2011

(87) PCT Pub. No.: WO2010/020062
PCT Pub. Date: Feb. 25, 2010

(65) Prior Publication Data
US 2011/0220278 A1    Sep. 15, 2011

Related U.S. Application Data

(60) Provisional application No. 61/090,375, filed on Aug. 20, 2008.

(51) Int. Cl.
*B29D 11/00* (2006.01)
*G02B 3/00* (2006.01)

(52) U.S. Cl.
CPC ........ *B29D 11/0073* (2013.01); *G02B 3/0012* (2013.01); *B29D 11/00278* (2013.01)
USPC ............ 156/256; 156/290; 156/291; 156/292

(58) Field of Classification Search
USPC .................. 156/250, 256, 290, 291, 292
See application file for complete search history.

(56) References Cited

U.S. PATENT DOCUMENTS

| | | |
|---|---|---|
| 2003/0010431 A1 | 1/2003 | Feldman et al. |
| 2007/0010122 A1 | 1/2007 | Wang |
| 2008/0054506 A1 | 3/2008 | Rudmann et al. |
| 2008/0054507 A1 | 3/2008 | Rudmann et al. |
| 2009/0159200 A1 | 6/2009 | Rossi et al. |
| 2011/0024030 A1 | 2/2011 | Rudmann et al. |
| 2011/0031510 A1 | 2/2011 | Rossi et al. |
| 2011/0032409 A1 | 2/2011 | Rossi et al. |
| 2011/0043923 A1 | 2/2011 | Rossi et al. |

FOREIGN PATENT DOCUMENTS

| | | |
|---|---|---|
| EP | 1022108 A1 | 7/2000 |
| EP | 1070972 A2 | 1/2001 |
| WO | 2004/027880 A2 | 4/2004 |
| WO | 2005/071445 A1 | 8/2005 |
| WO | 2005/083789 A2 | 9/2005 |

*Primary Examiner* — Jeff Aftergut
(74) *Attorney, Agent, or Firm* — Rankin, Hill & Clark LLP

(57) ABSTRACT

A method wherein firstly a spacer arrangement and a first wafer are brought together with each other with a first portion of curable adhesive between a first side of the spacer arrangement and the first substrate, to produce a partial stack, and then a second wafer is brought together with a second side of the spacer arrangement, with a second portion of curable adhesive between the second side of the spacer arrangement and the second wafer. Then, the first portion of the curable adhesive and the second portion of the curable adhesive are cured simultaneously.

18 Claims, 4 Drawing Sheets

METHOD OF MANUFACTURING A PLURALITY OF OPTICAL DEVICES

BACKGROUND OF THE INVENTION

1. Field of the Invention

The invention is in the field of manufacturing integrated optical devices with at least one optical element, e.g. refractive and/or diffractive lens, in a well defined spatial arrangement on a wafer scale. Such integrated optical devices are, for example, camera devices, especially mobile phone cameras or cameras of other electronic devices. As an other example, the devices may be optics for camera devices. More concretely, the invention relates a method of fabricating a plurality of integrated optical devices on a wafer scale comprising stacking at least two wafer-scale elements in an axial (or 'vertical') direction, with a spacer arrangement between the two waver-scale elements. The invention further relates to an optical device manufactured by means of such a method.

2. Description of Related Art

Manufacturing of—active or passive—optical devices on a wafer scale is becoming increasingly important. A reason is the ongoing trend to make optical devices a low cost mass product. Optical devices, such as cameras or integrated camera optics, are nowadays integrated in a large percentage of any electronic devices manufactured, including mobile phones, computers, etc.

Of special interest are the wafer-scale fabrication processes, where an array of optical elements is fabricated on a large-scale, for example disk-like ("wafer-") structure, which subsequent to replication is separated ("diced") into the individual elements. In such wafer-scale manufacturing, for example, optical lenses are produced by providing a wafer and replicating an array of according refractive (and/or diffractive) optical elements thereon. The array is subsequently diced into the individual lenses, which then are assembled with other lenses and/or an optically active element such as a CMOS or CCD sensor array.

A disadvantage in this is that the individual assembling step is still a time consuming task. Therefore, it has been proposed, for example in U.S. patent application Ser. No. 12/180,175 incorporated herein by reference in its entirety, to assemble the different components on a wafer scale, and to carry out the dicing step only after the wafer-scale assembly. The wafers for this comprise optical, elements in a well-defined spatial arrangement on the wafer. Such a wafer scale package (wafer stack) comprises at least two wafers that are stacked along the axis corresponding to the direction of the smallest wafer dimension (axial direction) and attached to one another. At least one of the wafers bears passive optical elements, and the other can also comprise passive optical elements or can be intended to receive other functional elements, such as active optical elements (electro-optical elements such as CCD or CMOS sensor arrays). The wafer stack, thus, comprises a plurality of generally identical integrated optical devices arranged side by side. In such a wafer-scale assembly process, the corresponding individual components have to be aligned with sufficient accuracy. After stacking, the wafer stack is separated ('diced) into the individual elements.

A first example of such a stack, subsequently diced, is a stack of two or more optical wafers. The optical wafers are transparent, wafer-like substrates that comprise arrays of optical lenses and/or other optical elements. The arrays of the optical elements are aligned with respect to each other, so that one or more optical elements of each wafer together with one or more corresponding optical elements of another wafer forms an optical sub-assembly, which after dicing is an integrated optical device that may form a functional unit (for example a camera optics) or sub-unit (for example a lens sub-assembly of a camera optics).

A further example of a stack subsequently diced is a stack of at least one optical wafer and in addition of an electro-optical wafer that may, for example, comprise an array of image sensor areas to be aligned with the corresponding array of optical elements, so that so that after dicing the integrated optical device with one or more optical elements of the optical wafer(s) together with one or more corresponding electro-optical elements of the electro-optical (semiconductor) wafer forms a functional unit (such as a camera module) or sub-unit (such as a sensor module for a camera). Some examples of such stacks are, for example, described in WO 2005/083 789.

In such a wafer stack, the at least two wafers are separated by spacer means, e.g. a plurality of separated spacers or an interconnected spacer matrix as disclosed in US 2003/0010431 or WO 2004/027880, and optical elements can also be arranged between the wafers on a wafer surface facing another wafer. Thus, a spacer is sandwiched between a top wafer and a bottom wafer. This arrangement may be repeated with further wafers and intermediary spacers.

In U.S. patent application Ser. No. 12/180,175, it has been proposed to use replicated spacer wafers of a plastic material.

If the wafer(s) and the spacer elements, especially if the spacer elements are spacer wafers or other spacer elements surrounding a plurality of optical elements, are of unequal material, a problem may arise when they are connected to each other. During fabrication processes, such as during curing of adhesive layers, the temperatures will not be constant, and with wafers with different thermal expansion coefficients there is a risk that the stack will bow during the curing process.

BRIEF SUMMARY OF THE INVENTION

It is an object of the present invention to provide a method of manufacturing integrated optical devices on a wafer scale, which method overcomes drawbacks of prior art methods and especially ensures that there is no bending of the stack during manufacturing.

According to an aspect of the invention, firstly the spacer arrangement and the first wafer are brought together with a first portion of curable adhesive between a first side of the spacer arrangement and the first substrate, to produce a partial stack, and then the second wafer is brought together with a second side of the spacer arrangement, with a second portion of curable adhesive between the second side of the spacer arrangement and the second wafer, while the first portion of curable adhesive is still uncured. Then, the first portion of the curable adhesive and the second portion of the curable adhesive are cured simultaneously.

The steps of "bringing together" a wafer and the spacer arrangement may include bringing the respective elements together until they touch at some spot (for example at peripheral protruding portions of the—replicated—spacer arrangement if the same is a spacer wafer), but may as well include bringing them together only until they are at a distance corresponding to a layer thickness of a layer of the adhesive material portions.

The first portion and the second portion of curable adhesive are preferably, but not necessarily of a same adhesive material, such as a suitable epoxy resin (some components such as additives may slightly differ, especially the surfaces of the first and second wafers that come into contact with the adhesive differ). If the first and second portion of curable adhesive material are not of a same material, they should be such as to allow simultaneous curing, i.e. they should exhibit approximately equal curing times; while the curing mechanism is preferably the same, but needs not be the same (for example, one portion may be curable by thermal curing while the other may be curable by irradiation, such as UV curing).

In contrast to prior art approaches, therefore, the invention proposes to bring the second substrate in contact with the partial stack before the components of the partial stack are affixed to each other. Rather, the constituents of the partial stack are only weakly and provisionally bonded to each other by the sticking action of the uncured adhesive. Additional fixation, for example by means of a mechanical holding means, is possible, but often not necessary.

Aspects of the invention use the insight that when both adhesive layers are cured simultaneously, any potential stress may even out during a first stage of the curing step while the adhesive is still flexible. Also, potential stress may be symmetrically distributed (especially if the first and second wafers are of a same material or of materials with similar coefficients of thermal expansion, which is often the case), so that no bow occurs. In any case, due to the approach according to the invention it is ensured that no bowing of the stack is effectively prevented.

It is a further insight of the inventors of the present that for a sufficiently low viscosity of the curable adhesive material(s), capillary forces may have two effects:

they may, when the adhesive material portions are present as pluralities of droplets distributed over the spacer surface and/or the wafer surface, cause the adhesive material to fill an entire gap between the respective elements, so that an entire surface of the spacer arrangement (or a large portion thereof) is then covered by the adhesive material;

they may cause a surprising primary stability that makes, for example, possible that the partial stack of the first wafer and the spacer arrangement is sufficiently stable for the second wafer to be brought together with the spacer arrangement (while the same is already, via the adhesive, in contact with the first wafer).

Prior to the curing step, the first and second wafers are preferably aligned with each other. For example, the second wafer may be brought in contact with the partial stack in a mask aligner. Depending on the application, alignment has to be done with accuracy sufficient for the optical purpose, usually of about at most 20 μm, preferably not more than 10 μm, especially preferred not more than 5 μm. However, alignment of the spacer arrangement to either of the wafers need usually not be as precise; depending on the design an accuracy of 100 μm may be sufficient. Therefore, even if, due to the weak bond between the first wafer and the spacer arrangement before the curing, the first wafer and the spacer arrangement slightly shifted with respect to each other when the second wafer is brought together with them, this would not have any adverse effect on the quality of the device finally produced. In practice it has been found that due to capillary forces the primary stability of the bond is often strong enough for the spacer wafer and the first wafer not to shift with respect to each other at all.

The integrated optical devices manufactured by the method preferably comprise at least one passive optical element (such as a lens), and in addition may comprise an additional passive optical element and/or an active optical element such as an image sensor. The passive optical element(s) may include one functionality (such as a lens functionality) or may include a plurality of functionalities (such as a lens functionality and an aperture and/or baffle functionality and/or a filter functionality etc.).

Accordingly, the wafer stack from which the integrated optical devices are manufactured by dicing comprises at least one optical wafer and may additionally comprise at least one further optical wafer and/or at least one electro-optical wafer.

If the integrated optical devices comprise more than two optical elements (passive optical elements and/or electro-optical elements), they may be manufactured by dicing a wafer stack of accordingly more than two wafers. The method according to the invention may then be carried out as one or more of the following:

As a bonding step for bonding a first pair of the at least three wafers to each other, with a spacer arrangement between them;

As a bonding step for bonding an already bonded sub-stack (being a pair or triple or quadruple etc. of already bonded wafers) to a further wafer or sub-stack of wafers, where the already bonded sub-stack(s) of wafers may have been bonded by the approach according to the invention or by a different approach;

As a bonding step for simultaneously bonding more than two wafers (and/or sub-stacks of already-bonded wafers) together, with spacer arrangements between adjacent wafers (or units of already-bonded wafers, respectively).

In other words, one or both of the first and the second wafer secured to each other by the approach according to the invention may optionally be an outermost wafer of a wafer sub-stack.

In a preferred embodiment, in contrast to the prior art, no external force is applied in addition to a possible wafer holding force in the mask aligner or similar device and/or gravity and in addition to capillary forces holding the wafer(s) and the spacer arrangement together. Especially, no mechanical pressing or holding or clamping force pressing the wafers against each other needs to be applied during curing of the adhesive. Also, no pressing or holding or clamping force pressing the wafer and the spacer arrangement against each other needs to be applied to the partial stack to fix the wafer and the spacer arrangement with respect to each other. Further, there is no need to fix the partial stack of the first wafer and the spacer arrangement and of the second wafer for transferring the assembly to a curing stage. Rather, according to a first variant, the portions of adhesive material are simultaneously cured right at the place where the partial stack and the second wafer are brought together (for example the mask aligner). According to a second variant, the assembly of the first and second wafers and the spacer arrangement may be transferred to a separate curing stage without specific pressing or holding or clamping forces applied.

The spacer arrangement in all embodiments may be a plastic spacer wafer, for example manufactured by a replication (molding, embossing etc.) step, for example as disclosed in U.S. patent application Ser. No. 12/180,175. As an alternative, the spacer arrangement may be a spacer wafer of glass, metal or other material. As a further alternative, the spacer arrangement may comprise a plurality of spacers (that may for example be plastic spacers), each spacer encompassing a large number of optical elements, preferably at least 25 optical elements. The spacer wafer may be transparent or intransparent.

The spacer wafers (or the plurality of spacers), may be essentially be wafer-like (or plate like) with a through hole at each lateral position of an optical element.

According to a further aspect of the invention, a method for manufacturing a plurality of integrated optical devices is provided, the method comprising the steps of manufacturing, by a replication technique, a first optical wafer with a plurality of passive optical elements, of manufacturing, by the method described above, a wafer stack that includes the first optical wafer, and of separating the wafer stack into the individual integrated optical devices. Therein, the wafer stack is fabricated by "vertically" (i.e. in the direction perpendicular to the surface of largest extension) stacking the wafers, and the separating is a "horizontal" separating.

According to yet another aspect of the invention, a wafer stack manufactured substantially by the method described above is provided. According to yet another aspect, an integrated optical device is provided, the integrated optical device being manufactured by separating a wafer stack produced by the method described above.

'Wafer' or 'Wafer scale' in this text generally refers to the size of disk like or plate like substrates of sizes comparable to semiconductor wafers, such as disks or plates having diameters between 5 cm and 40 cm. A wafer or substrate in the meaning used in this text is a disc or a rectangular plate or a plate of any other shape of any dimensionally stable material; if the wafer is an optical wafer the material is often transparent. The diameter of a wafer disk is typically between 5 cm and 40 cm, for example between 10 cm and 31 cm. Often it is cylindrical with a diameter of either 2, 4, 6, 8 or 12 inches, one inch being about 2.54 cm. The wafer thickness of optical wafers is, for example, between 0.2 mm and 10 mm, typically between 0.4 mm and 6 mm. Although preferably the wafers have the shapes of circular discs, like semiconductor wafers, other shapes such as approximately rectangular shapes, hexagonal shapes etc. are not excluded. The term 'wafer' in this text is generally not to be interpreted as restricting in terms of shape.

BRIEF DESCRIPTION OF THE DRAWINGS

Principles of the invention as well as embodiments thereof will be explained in more detail in the following text with reference to the attached drawings. In the drawings, same reference numerals denote same or analogous elements. The drawings are all schematic and not to scale. They show.

DESCRIPTION OF THE PREFERRED EMBODIMENTS

Figure 1A:
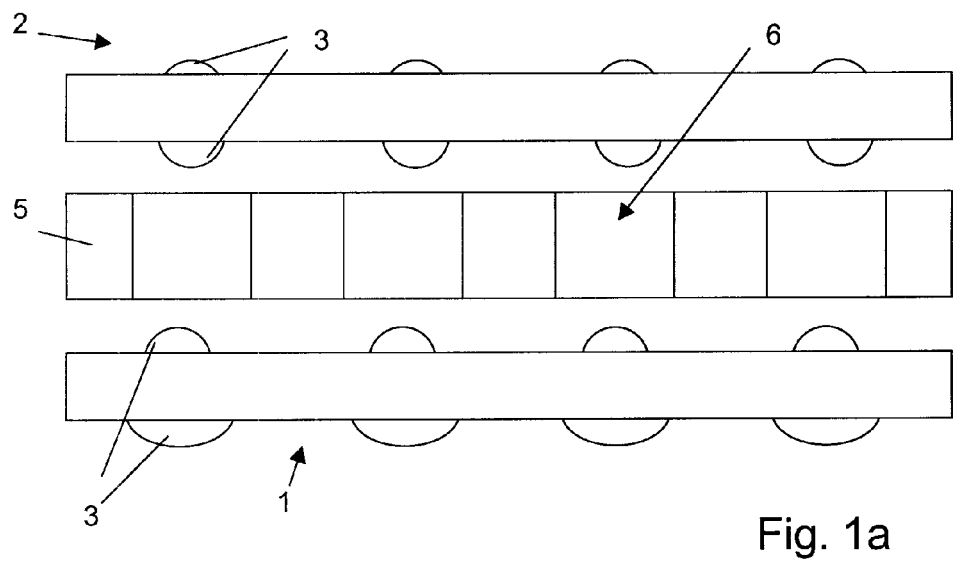
FIGS. 1a-1d Method steps of a method of manufacturing a plurality of integrated optical devices.

FIG. 1a shows two optical wafers 1, 2, each comprising a plurality of replicated sections 3. The wafers 1, 2 may, for example, be of glass or of an other suitable transparent material, such as transparent plastics like a transparent PMMA. The replicated sections 3 may be of a replicated UV cured epoxy or other suitable, preferably transparent material. The replicated sections may, for example, be replicated so that replication material is confined to certain areas while other areas are free of replication material. An according replication method is disclosed in US 2008/0 054 506 incorporated herein by reference in its entirety. As an alternative, the replication material may have been added with a method that does not confine the replication material, which method may include spreading the replication material in an uncured state substantially over a large surface area of the respective wafer substrate, as for example disclosed in embodiments described in US 2008/0 054 507. In such a case, suitable measures may have been taken to make sure that in regions where the spacer arrangement (here being a spacer wafer) is brought together with the substrate, the replicated surface is substantially flat or otherwise matches the shape of the spacer wafer.

U.S. provisional patent application No. 61/014,813, also incorporated herein by reference discloses approaches of making wafer-scale replication especially rational.

In the shown embodiment, two corresponding replicated sections 3 of the respective wafers together with the wafer material between them form a refractive lens. In other designs, such as the ones of U.S. provisional patent application No. 60/990,451 or of U.S. provisional patent application No. 61/014,811, both incorporated herein by reference in their entirety, the replicated sections may cooperate in a different manner.

Further to the shown replication sections, the optical wafers 1, 2 may comprise further elements or layers such as IR filters, baffles (see for example U.S. provisional patent application No. 61/014,805), alignment marks etc., these other elements or layers not being shown in the Figures.

FIG. 1a further shows a spacer wafer 5. The spacer wafer may be a plastics spacer wafer, the manufacturing of which has been disclosed in U.S. application Ser. No. 12/180,175 also incorporated herein by reference in its entirety. As an alternative, the spacer wafer may be of different materials and/or manufactured in a different way than the one disclosed in the named US patent application.

The spacer wafer 5 depicted in the figure comprises a plurality of through holes at locations corresponding to the locations of the replicated sections 3.

Figure 1B:
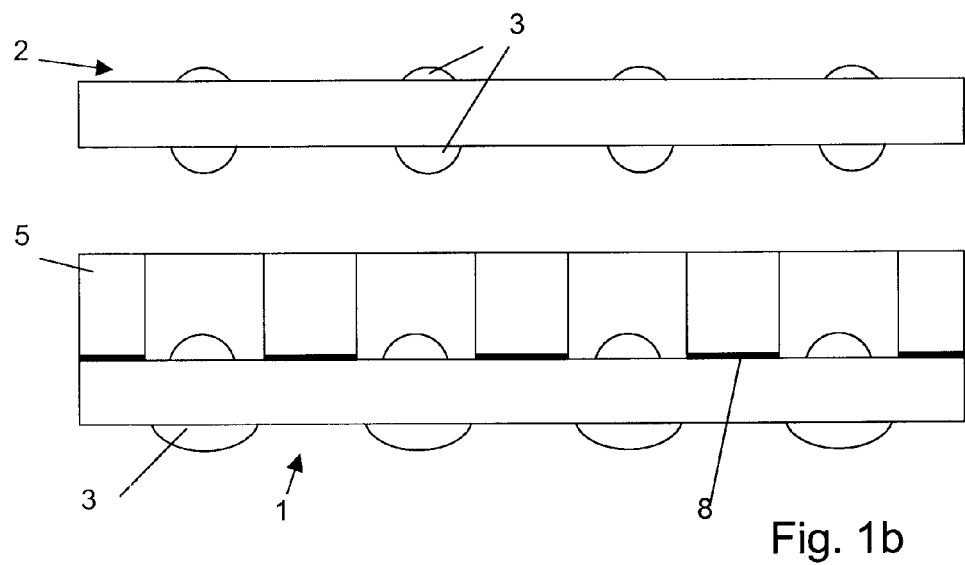

As depicted in FIG. 1b, the spacer wafer 5 and the first wafer 1 (corresponding to the bottom wafer in the figures) are firstly brought together with each other with a curable adhesive 8 between them. The curable adhesive in the figure is depicted as curable adhesive layer 8, substantially covering the lower side of the spacer wafer 5. This is preferable, because by this measure the replicated sections 3 are automatically kept free of adhesive material. However this need not be the case. Rather, the adhesive may also be present as a plurality of droplets adhering to the spacer wafer or to the optical wafer, or it may be present as a layer covering only a fraction of the lower surface area of the spacer wafer 5.

The adhesive material may, for example, be applied by a jet printing or jet spraying process in which, like in an inkjet printer, droplets are applied by a jet head that scans over the surface and ejects the droplets at places where the adhesive is to be. The ensemble of the droplets does not need to cover an entire surface portion of the spacer wafer or the wafer, but may alternatively comprise the discrete droplets that flow into each other only when the spacer wafer and the wafer are brought together—because of the named capillary forces.

As a second example, the adhesive material may be applied by a screen printing like process, or by a lithographic process or by another printing process, or by other means such as a squeegee etc. The skilled person knows many further ways of applying small amounts of an essentially liquid material onto a surface, in a position sensitive manner or in a surface covering manner.

Figure 1C:
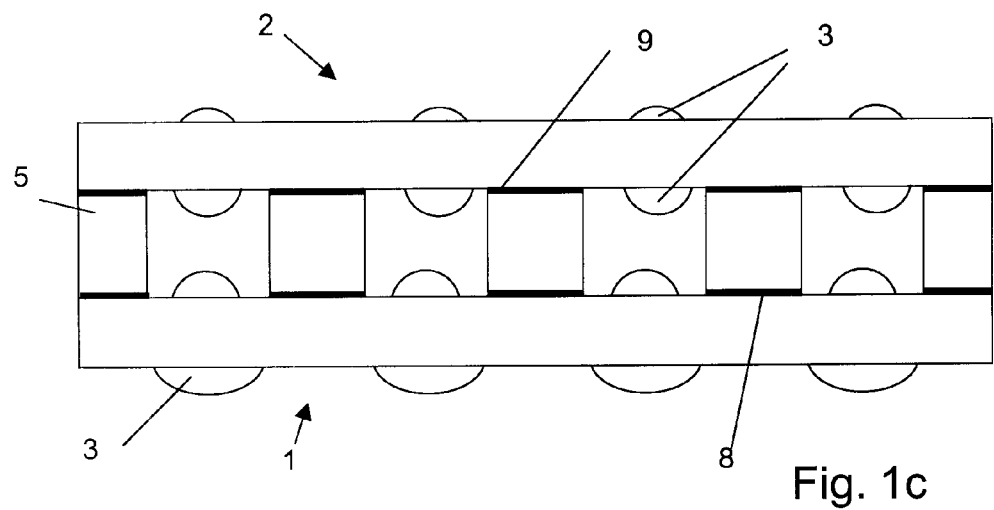

In accordance with an approach of the invention, the adhesive layer 8—that forms the first portion of a curable adhesive—is not cured prior to the step illustrated in FIG. 1c. In this step, the second side of the spacer wafer 5 and the second optical wafer 2 are brought together with each other, with a second portion of replication material 9 between them. Also the second portion 9 may be present, as illustrated, as a layer substantially covering a large fraction of the upper side of the spacer wafer 5, or as a portion otherwise dispensed on the spacer wafer 5 or on the second optical wafer 2.

While in the embodiment shown in FIGS. 1b and 1c, the second portion 9 of curable adhesive is applied to the spacer wafer after the spacer wafer and the first optical substrate are brought together, this need not be the case. Rather, both portions of the curable adhesive may be dispensed on the spacer wafer (and/or the optical wafers if the case may be) before the spacer wafer 5 is brought into contact with the first optical wafer 2.

While the second optical wafer 2 and the spacer wafer 5 are brought into contact with each other and/or thereafter, the first and second optical wafers 1, 2 are aligned with respect to each other. This may be done by an appropriate apparatus, such as a mask aligner, and/or may, for example, be done using the means disclosed in U.S. provisional patent application 61/014,813. Alignment of the two optical wafers, by this, may be done with an accuracy sufficient for the purpose, for example of the two lenses. The alignment of the spacer wafer 5 to the two optical wafers, in contrast may be precise but may as an alternative be only coarse. It is often not crucial as long as the spacer wafer does not come too close to the replicated sections 3.

Figure 1D:
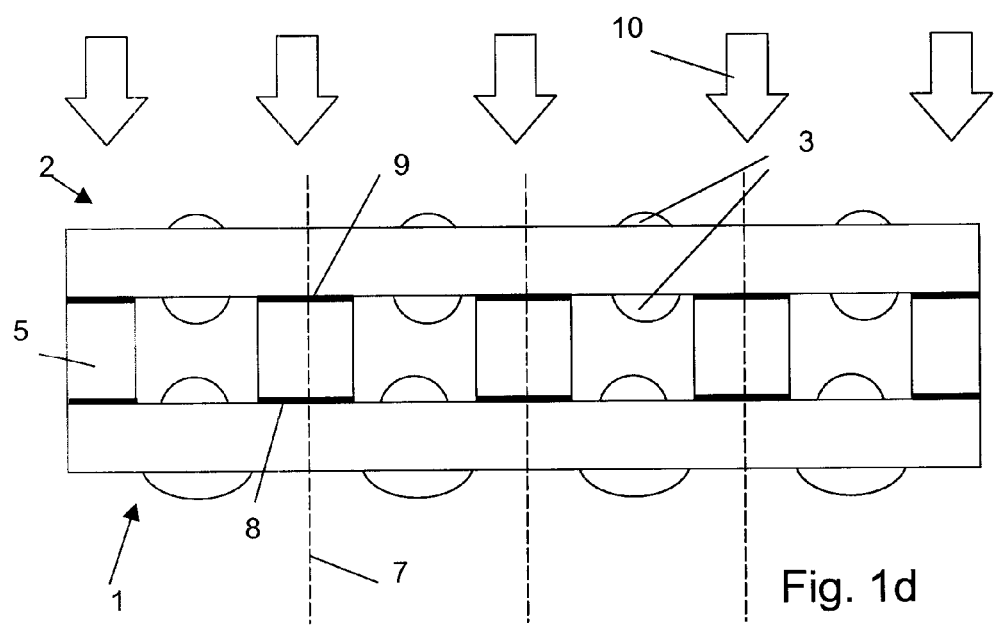

FIG. 1d depicts the assembly of FIG. 1c while UV radiation 10 impinges on it. The radiation causes the adhesive layers 8, 9 to be cured. Since the wafers are optical wafers and transparent for the UV radiation, illumination from one side will be sufficient.

If the adhesive layers are not UV curable, but for example curable by thermal curing, accordingly other means (such as heating etc.) will be applied instead of UV illumination. The teaching of the present invention does not rely on the curing mechanism or curing mechanisms.

Due to the UV radiation, the temperature may rise, for example by between 10° and 30°. Because of the approach according to the invention, this will not cause any bending of the assembly, even if the constituents (the individual wafers) are themselves comparably easily bendable (for example, the optical wafers may be 400 μm thick glass wafers, which can readily be bent by hand). The same holds for the situation where, for example because the adhesive layers have to be thermally cured, the temperature rise is substantially greater than just 10° to 30° but for example 50° or even 100° or more.

The dashed lines 7 in FIG. 1d indicate the places where in a subsequent step—often after additional assembling steps, see also FIG. 4 below—the wafer stack is diced into the individual integrated optical devices.

Processes analogous to the above sketched process for stacking two optical wafers can be applied to stack an optical wafer and an electro-optical wafer on top of each other.

Figure 2:
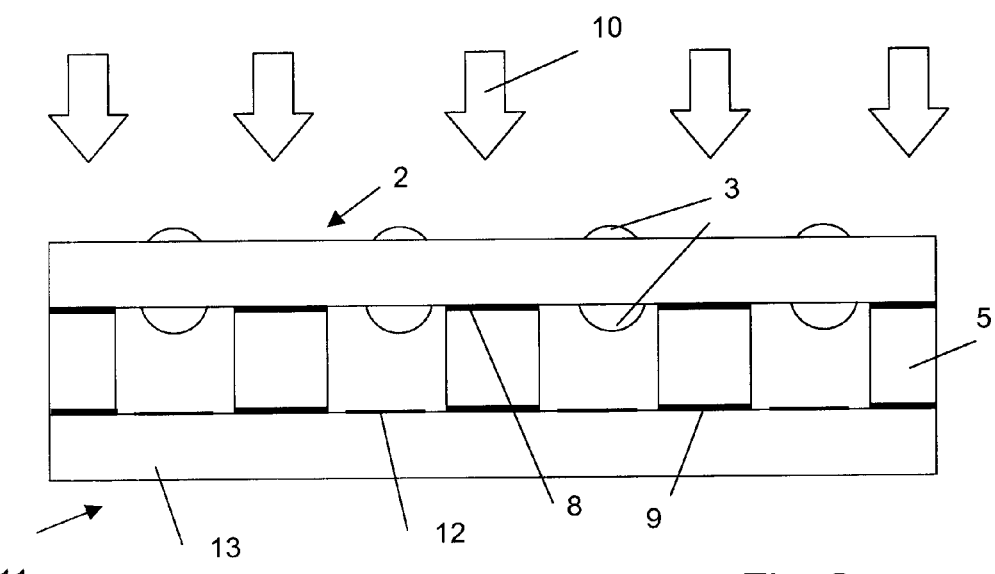
FIGS. 2 and 3 alternative arrangements manufactured by a method according to aspects of the invention.

FIG. 2 illustrates the step of simultaneously curing a first and second portion of adhesive material 8, 9 for an assembly of an optical wafer 2 and an electro-optical wafer 11, which may, for example, be a Si based CMOS wafer comprising a plurality of CMOS image sensor fields 12 provided on an Si based wafer 13. Of course, other wafers may also be used, for example wafers comprising CCD sensor fields. The glass wafer—depending on the material choice—and the Si wafer will have similar coefficients of thermal expansion, so that the difference to the plastic spacer wafer 5, that will have a completely different coefficient of thermal expansion—is, due to the approach according to the invention, of minor importance.

Figure 3:
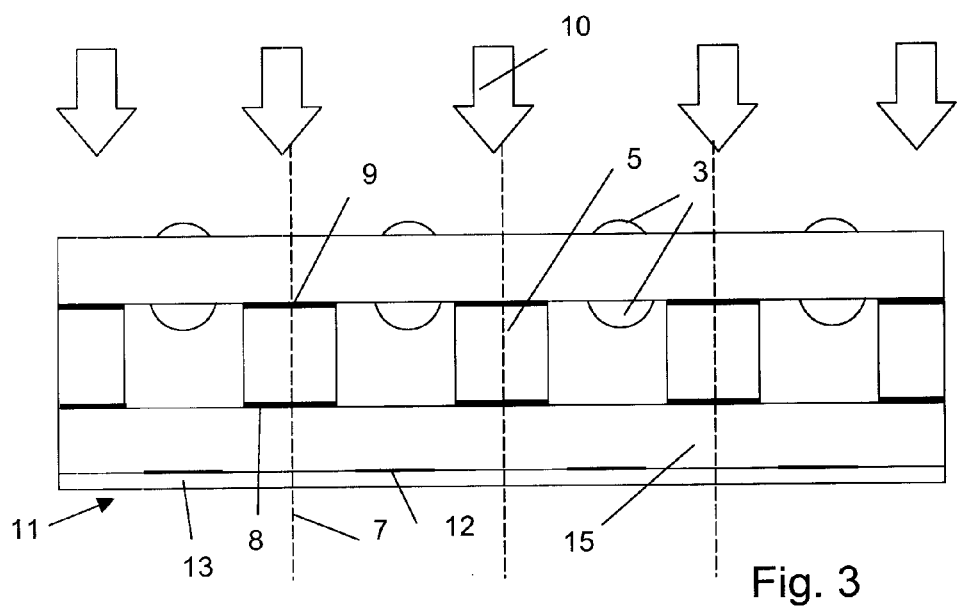

FIG. 3 also illustrates the simultaneous curing of a first and second portion of adhesive material for an assembly of an optical wafer 2 and an electro-optical wafer, where the electro-optical wafer comprises a thinned sensor wafer 13 with the sensor fields 12, the sensor wafer may be a CMOS wafer. The sensor wafer 13 may, for example, be based on the TSV (Through Silicon Via) technology that allows contacting the sensor fields from the backside. Other approaches of contacting sensor fields from the back side, which approaches may include locally, at the periphery of the sensor fields, etching the semiconductor wafer through, are known in the art, and the invention is also applicable for these.

On top of the "front" surface (the surface with the sensor fields), the electro-optical wafer 11 comprises a glass wafer 15 bonded to the thinned sensor wafer 13, the glass wafer ensuring mechanical stability and at the same time protection of the sensor fields. It is also the glass wafer that is brought together with the spacer wafer with a portion of adhesive material 8 therebetween.

In the embodiments of FIGS. 2 and 3, the process may be completely analogous to the process described referring to FIGS. 1a-1d, with the electro-optical wafer either replacing the first or the second optical wafer (i.e. in the arrangement of FIGS. 2 and 3, either the optical wafer 2 or the electro-optical wafer 11 can be the first to be brought together with the spacer wafer 5, with curable adhesive material therebetween).

Figure 4A:
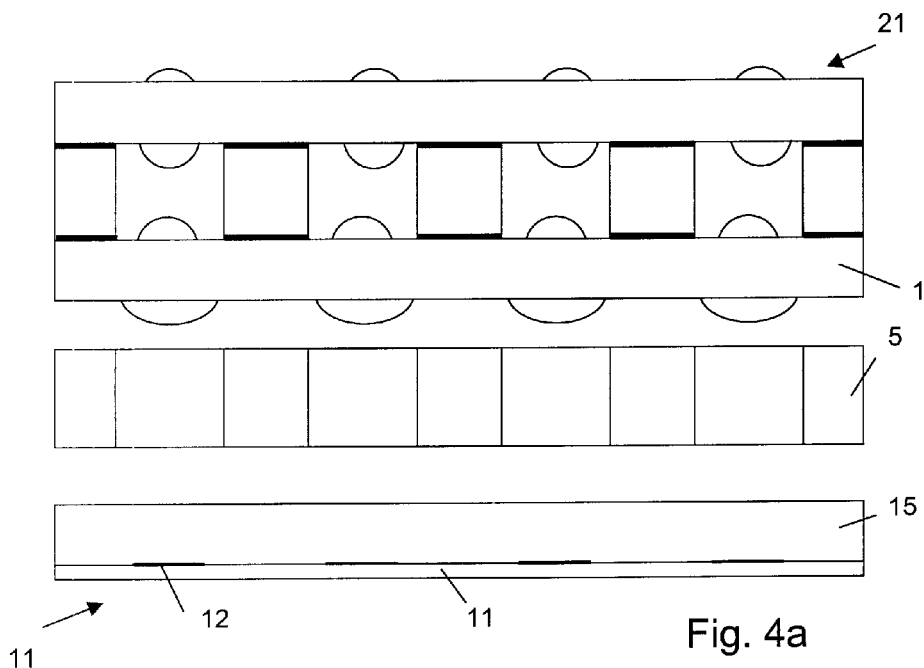
FIGS. 4a and 4b yet another arrangement manufactured by a method according to the invention.
Figure 4B:
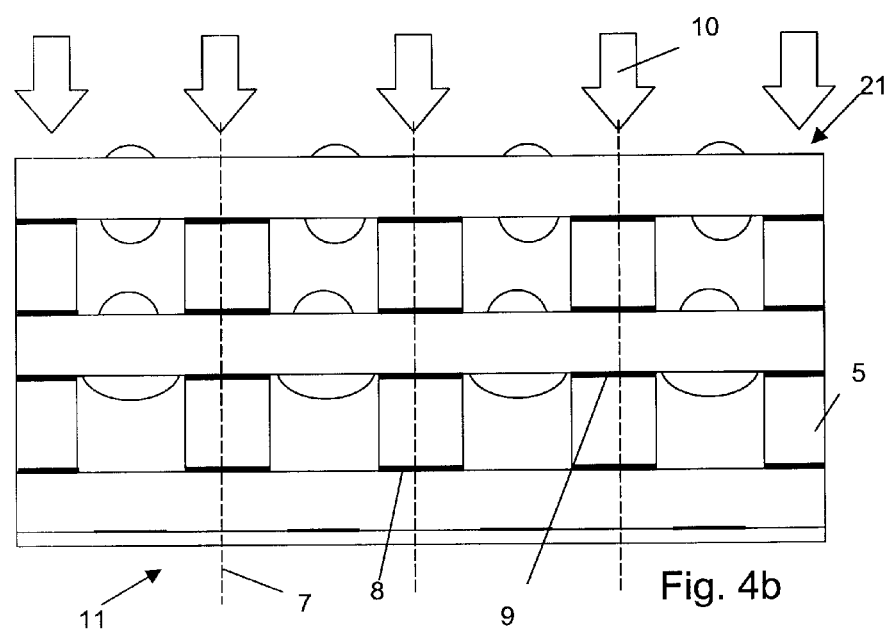

FIGS. 4a and 4b, finally, illustrate using the method according to an aspect of the invention to bond an electro-optical wafer 11 to an optical wafer stack 21, with a spacer arrangement (such as a spacer wafer) 5, between the electro-optical wafer 11 and the optical wafer stack 21.

The optical wafer stack comprises at least two already bonded optical wafers. For example, the wafer stack may be manufactured by the process explained referring to FIGS. 1a-1d above. As an alternative, the wafer stack may be manufactured conventionally.

In the approach according to an aspect of the invention, an outermost wafer (the bottom optical wafer 1 in the depicted embodiment) is bonded to the electro-optical wafer in a manner completely analogous to the above-described embodiments by having the first and second portions of curable adhesive material 8,9 cured simultaneously (FIG. 4b). Also in this, either the optical wafer stack 21 or the electro-optical wafer 11 can be the first to be brought together with the spacer wafer 5, with curable adhesive material therebetween.

What is claimed is:

1. In a method of fabricating a plurality of integrated optical devices by means of a wafer-scale process, a method of manufacturing a wafer stack comprising at least one optical wafer, the method comprising the steps of:

providing a first and a second wafer and a spacer arrangement;

bringing the first wafer and a first side of the spacer arrangement together, with a first portion of a curable adhesive between the first wafer and the spacer arrangement;

bringing the second wafer and a second side of the spacer arrangement together, with a second portion of a curable adhesive between the second wafer and the spacer arrangement;

aligning the first and second wafers to each other; and thereafter transferring an assembly comprising said first and second wafers and said spacer arrangement to a separate curing stage without applying to said assembly pressing or holding or clamping forces for fixing the assembly during transfer; and simultaneously curing the first and the second portion of curable adhesive in said separate curing stage.

2. The method according to claim 1, wherein the spacer arrangement is a plastic spacer wafer.

3. The method according to claim 1, wherein the first portion of a curable adhesive and the second portion of a curable adhesive are both of about a same adhesive material.

4. The method according to claim 1, wherein during curing no external mechanical pressing force pressing the first and second wafers against each other is applied.

5. The method according to claim 4, wherein after the bringing of the second wafer and a second side of the spacer arrangement together, no external mechanical pressing force pressing the first and second wafers against each other is applied until the curing is finished.

6. The method according to claim 1, further comprising the step of applying the first portion of curable adhesive to the spacer arrangement and/or to the first wafer by spraying a plurality of curable adhesive droplets to defined locations on the spacer arrangement and/or the first wafer, prior to bringing the first wafer and the first side of the spacer arrangement together.

7. The method according to claim 1, further comprising the step of applying the first portion of curable adhesive to the spacer arrangement and/or to the first wafer by screen-printing the first portion of curable adhesive to the spacer arrangement and/or the first wafer, prior to bringing the first wafer and the first side of the spacer arrangement together.

8. The method according to claim 1, further comprising the step of applying the second portion of curable adhesive to the spacer arrangement and/or to the second wafer by spraying a plurality of curable adhesive droplets to defined locations on the spacer arrangement and/or the second wafer, prior to bringing the second wafer and the second side of the spacer arrangement together.

9. The method according to claim 1, further comprising the step of applying the second portion of curable adhesive to the spacer arrangement and/or to the second wafer by screen-printing the second portion of curable adhesive to the spacer arrangement and/or the second wafer, prior to bringing the second wafer and the second side of the spacer arrangement together.

10. The method according to claim 1, wherein the step of bringing the second wafer and a second side of the spacer arrangement together includes the sub-step of aligning the second wafer with respect to the first wafer.

11. The method according to claim 1, wherein the step of simultaneously curing the first and the second portion of curable adhesives includes irradiating an assembly comprising the first and the second wafers and the spacer arrangement with electromagnetic radiation.

12. The method according to claim 11, wherein the step of simultaneously curing the first and the second portion of curable adhesives includes irradiating the assembly with electromagnetic radiation from one large-surface side only.

13. The method according to claim 1, wherein the first wafer is chosen to be an optical wafer and the second wafer is chosen to be an optical wafer.

14. The method according to claim 1, wherein the first wafer is chosen to be an optical wafer and the second wafer is chosen to be an electro-optical wafer.

15. The method according to claim 1, wherein at least one of the first wafer and of the second wafer is a wafer of a sub-stack comprising a plurality of wafers.

16. The method according to claim 1, comprising the steps of providing a third wafer and a second spacer arrangement, of bringing the second spacer arrangement and the second wafer together, with a third portion of a curable adhesive between the second wafer and the second spacer arrangement, and of bringing the third wafer and the second spacer arrangement together, with a fourth portion of a curable adhesive between the third wafer and the second spacer arrangement, wherein the step of simultaneously curing the first and the second portion of curable adhesives includes simultaneously curing all of the first, the second the third and the fourth portions of curable adhesive.

17. The method according to claim 1, wherein the first and second wafers are chosen to be optical wafers, each with a plurality of replicated passive optical elements, the method comprising, after simultaneously curing the first and the second portion of curable adhesive to provide a wafer-sub-stack, the additional step of providing a third wafer being an electro-optical wafer, and a further spacer arrangement, bringing the third wafer and the spacer arrangement together, with a third portion of a curable adhesive between the third wafer and the further spacer arrangement, and bringing the further spacer arrangement and the sub-stack together with a fourth portion of a curable adhesive between the further spacer arrangement and the sub-stack, wherein the steps of bringing the further spacer arrangement and the third wafer together and of bringing the further spacer arrangement and the sub-stack together are carried out in any sequence, and the method comprising the further step of simultaneously curing the third and fourth portions of curable adhesive.

18. A method for manufacturing a plurality of integrated optical devices, the method comprising the steps of manufacturing, by a replication technique, a first optical wafer with a plurality of passive optical elements, of manufacturing, by the method according to claim 1, a wafer stack that includes the first optical wafer, and of separating the wafer stack into the individual integrated optical devices.

* * * * *